United States Patent [19]

Kim et al.

[11] Patent Number: 4,626,424
[45] Date of Patent: Dec. 2, 1986

[54] METHOD OF PRODUCING CRYSTALLINE AMMONIUM METATUNGSTATE

[75] Inventors: Tai K. Kim, Towanda; Robert P. McClintic, Montroeton, both of Pa.

[73] Assignee: GTE Products Corporation, Stamford, Conn.

[21] Appl. No.: 737,996

[22] Filed: May 28, 1985

[51] Int. Cl.$^4$ ............................................. C01G 41/00
[52] U.S. Cl. ...................................... 423/593; 23/300
[58] Field of Search ........................... 423/593; 23/300

[56] References Cited

U.S. PATENT DOCUMENTS 3,175,881  3/1965  Chiola et al. ......................... 423/593
3,925,028  12/1975  Lozano ................................. 423/170
4,430,310  2/1984  Malito et al. ......................... 423/129

OTHER PUBLICATIONS

Taylor, "The Ammonium Tungstates," JACS, vol. 24, (1902), pp. 629-643.
Skoog et al., *Fundamentals of Analytical Chemistry* (1963), pp. 151, 152, Holt, Rinehart and Winston, Inc.

Primary Examiner—John Doll
Assistant Examiner—Wayne A. Langel
Attorney, Agent, or Firm—Donald R. Castle

[57] ABSTRACT

A process is disclosed for producing a relatively pure solid ammonium metatungstate by precipitating the solid from a mixture of an ammonium metatungstate solution and a lower alcohol having the formula $C_nH_{n+1}OH$. The ammonium metatungstate solution which is used can be made by any means including the adjusting the pH of an ammonium paratungstate solution followed by digestion of the solution to form ammonium metatungstate.

3 Claims, No Drawings

METHOD OF PRODUCING CRYSTALLINE AMMONIUM METATUNGSTATE

FIELD OF THE INVENTION

This invention relates to a process for producing a relatively pure solid ammonium metatungstate by precipitating the solid from a mixture of ammonium metatungstate solution and methyl alcohol.

BACKGROUND OF THE INVENTION

At present both ammonium paratungstate and ammonium metatungstate are being used as tungsten sources in the catalyst industry. Since ammonium paratungstate has a limited solubility in water (about 2 to 3% at room temperature), the user converts ammonium paratungstate to a more soluble peroxide in order to prepare the catalyst. While ammonium metatungstate is highly water soluble and thus need not be converted, it is in general more expensive than ammonium paratungstate due to the complexity and/or low yields of processes for producing it.

U.S. Pat. No. 3,175,881 describes a process for producing crystalline ammonium metatungstate from ammonium paratungstate. According to this process, ammonium paratungstate is heated at about 500° F. to about 550° F. for about 1 hour and digested deionised water to form a solution containing about 9 to about 10% dissolved solids and some insolubles, the solution digested and evaporated to about one third of its original volume while the pH is maintained at about 3.5 in order to effect the conversion of ammonium paratungstate to ammonium metatung state, and the insolubles removed. Ammonium metatungstate is then crystallized from the resulting solution.

U.S. Pat. No. 3,472,613 describes a process for preparation of ammonium metatungstate. According to this process, a water slurry of ammonium paratungstate is adjusted to a pH of about 1.75 to about 3.5 with a mineral acid such as nitric acid, hydrochloric acid sulfuric acid or an organic acid such as acetic acid, lactic acid or formic acid. The slurry is maintained at from about 50° C. to about 120° C. until the ammonium paratungstate is substantially completely converted to ammonium metatungstate. Ammonium metatungstate is then crystallized from the resulting solution.

The ammonium metatungstate produced in the above processes can be contaminated particularly with the anion of the acid which was used to adjust the pH.

A process for producing ammonium metatungstate which is relatively pure especially with respect to the anion of the acid used to adjust the pH would be an advancement in the art.

SUMMARY OF THE INVENTION

In accordance with one aspect of this invention there is provided a process for producing a relatively pure solid ammonium metatungstate which involves forming an admixture of an ammonium metatungstate solution and a lower alcohol having the formula $C_nH_{2n+1}OH$ wherein n is from 1 to 4 to produce solid ammonium metatungstate, and separating the solid ammonium metatungstate from the mother liquor.

In accordance with another aspect of this invention there is provided a process for producing a relatively pure solid ammonium metatungstate which involves heating an aqueous slurry of ammonium paratungstate to a pH of from about 5.8 to about 6.0, then adjusting the pH to about 3.5, heating the solution for a sufficient time to effect the formation of ammonium metatungstate, removing the insolubles from the resulting ammonium metatungstate solution, forming an admixture of the ammonium metatungstate solution and a lower alcohol having the formula $C_nH_{2n+1}OH$ to precipitate solid ammonium metatungstate which is then separated from the resulting mother liquor.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This invention relates to a process for producing relatively purse solid ammonium metatungstate.

The ammonium metatungstate solution used as the starting material can be any ammonium tungstate solution. It is preferred to have a concentrated solution of ammonium metatungstate, containing preferably about 1165 grams of ammonium metatungstate per liter. However, a solution of any concentration can be used which will allow the solubility of the ammonium metatungstate to be exceeded when contacted with the alcohol. The alcohol is typically a lower alcohol having the formula $C_nH_{2n+1}OH$ wherein n is from 1 to 4. Especially preferred is methyl alcohol. An admixture is formed of the ammonium metatungstate solution and the alcohol. The ammonium metatungstate solution and the methyl alcohol can be contacted in any volume ratio. With methyl alcohol, preferred volume ratios of methyl alcohol to concentrated ammonium metatungstate solution that is, about 1165 grams of ammonium metatungstate per liter, are about 4 to 1 to about 10 to 1. Recovery of ammonium metatungstate under these conditions is about 77% to about 88%. At lower ratios of methyl alcohol to ammonium metatungstate solution, less ammonium metatungstate is recovered. The table below more fully illustrates volume ratios and percent of recovery.

| Volume Ratio of Methyl Alcohol and Ammonium Metaungstate Solution | Percent of Ammonium Metatungstate Recovered |
| --- | --- |
| 2 | 0.0 |
| 3 | 17.16 |
| 4 | 77.08 |
| 5 | 82.62 |
| 6 | 84.86 |
| 7 | 85.91 |
| 8 | 87.04 |
| 9 | 87.79 |
| 10 | 87.76 |

The solid ammonium metatungstate which forms can be separated from the mother liquor by any standard technique such as filtration.

The ammonium metatungstate solution can be produced from a solution which is formed with ammonium paratungstate as the starting material. The ammonium paratungstate which is used can be any ammonium paratungstate. The ammonium paratungstate is slurried in water, preferably deionized water. Preferred amounts of ammonium paratungstate are from about 2 to about 4 parts of water to about 1 part of ammonium paratungstate. The slurry is then heated until the pH stabilizes at about 5.8 to about 6.0. Heating can be done at any temperature with temperatures of from about 95° C. to about 100° C. being preferred. The pH is then adjusted to about 3.5 which is the pH range at which ammonium metatungstate forms. Any agent can be used to adjust the pH. Mineral acids such as nitric acid, sulfuric acid and hydrochloric acid or organic acids such as acetic, lactic, or formic acids are preferred. Generally the mineral acids are added in relatively dilute form to avoid localized irreversible formation of colloidal tungstic acid which happens when concentrated acid is used. Generally concentrations of about 3 Normal are strong enough to drop the pH without an appreciable increase in the volume of the solution and hence a decrease in concentration of the tungsten, and at the same time are dilute enough to avoid the formation of tungstic acid. The pH adjusted solution is digested at a temperature preferably near or at its boiling point for a period of time sufficient to effect the conversion of the tungsten to the metatungstate species. Digestion times are generally from about 3 hours to about 7 hours with from about 4 hours to about 6 hours being preferred. During the course of the digestion the volume is decreased in order to concentrate the ammonium metatungstate solution. Any insolubles which form are removed from the concentrated ammonium metatungstate solution by any standard technique such as filtration. The insolubles can be water washed to recover any ammonium metatungstate and the wash added to the concentrated ammonium metatungstate solution. The ammonium metatungstate solution is then contacted with methyl alcohol as described previously.

The resulting ammonium metatungstate is relatively low in the anion of the acid which is used to adjust the pH. For example, for a material produced from a solution adjusted with nitric acid, the nitrate content of the solid ammonium metatungstate is typically about 0.25% by weight as opposed to about 3.08% for ammonium metatungstate produced by the usual crystallization methods.

To more fully illustrate this invention, the following non-limiting examples are presented. All parts, portions, and percentages are by weight unless otherwise stated.

EXAMPLE 1

About 410 parts of ammonium paratungstate are slurried in about 1500 parts of deionized water and heated at about 95° C. to about 100° C. with the volume being kept constant until the pH becomes stable at about 5.8 to about 6.0. The pH is then adjusted to about 3.5 with about 3 normal nitric acid and digested at the boiling point for about 4 hours during which time the volume decreases to about one third of the original volume. The insolubles are then filtered off and washed with water to recover any ammonium metatungstate. About 200 parts of the digested solution is added to about 1130 parts of methyl alcohol and the mixture agitated for about 30 minutes. The solid ammonium metatungstate is then removed from the mother liquor by filtration. The solid ammonium metatungstate contains about 0.25% by weight nitrate as compared with about 3.08% for ammonium metatungstate obtained from nitric acid treated solutions by the usual crystallization methods.

EXAMPLE 2

The procedure described in example 2 is followed for making solid ammonium metatungstate fom ammonium paratungstate except that about 3 normal sulfuric acid is used to adjust the pH to about 3.5. The solid ammonium metatungstate contains about 0.09% by weight sulfacte as compared with about 1.06% sulfate for ammonium metatungstate obtained from sulfuric acid treated solutions by the usual crystallization methods. While there has been shown and described what are at present considered the preferred embodiments of the invention, it will be obvious to those skilled in the art that various changes and modifications may be made therein without departing from the scope of the invention as defined the appended claims.

What is claimed is:

1. A process for producing relatively pure solid ammonium metatungstate said process comprising:
    (a) forming a slurry of ammonium paratungstate in water,
    (b) heating said slurry to a pH of about 5.8 to about 6.0 to stabilize said slurry,
    (c) adjusting the pH of said slurry to about 3.5,
    (d) heating the resulting pH adjusted slurry for a sufficient time to form ammonium metatungstate,
    (e) removing insolubles from the resulting digested solution,
    (f) forming an admixture of said digested solution and a lower alcohol having the formula $C_nH_{2n+1}OH$ wherein n is from 1 to 4 to form a relatively pure solid ammonium metatungstate; and
    (g) separating said solid ammonium metatungstate from the resulting mother liquor.

2. A process according to claim 1 wherein said pH adjusted slurry is heated for from about 3 hours to about 7 hours.

3. A process according to claims 1 or 2 wherein said alcohol is methyl alcohol.

* * * * *